(12) United States Patent
Blomqvist et al.

(10) Patent No.: US 7,814,502 B2
(45) Date of Patent: Oct. 12, 2010

(54) SHARED LANDMARK USER INTERFACES

(75) Inventors: Mikko Blomqvist, Tampere (FI); Tommi Lane, Tampere (FI); Petri Rauhala, Tampere (FI)

(73) Assignee: Nokia Corporation, Espoo (FI)

( * ) Notice: Subject to any disclaimer, the term of this patent is extended or adjusted under 35 U.S.C. 154(b) by 1072 days.

(21) Appl. No.: 10/866,943

(22) Filed: Jun. 14, 2004

(65) Prior Publication Data
US 2005/0278696 A1 Dec. 15, 2005

(51) Int. Cl.
G06F 3/00 (2006.01)
G06F 21/00 (2006.01)
G06F 15/16 (2006.01)

(52) U.S. Cl. .................. 719/328; 713/182; 709/229

(58) Field of Classification Search ............. 719/328; 715/700; 713/182; 709/229
See application file for complete search history.

(56) References Cited

U.S. PATENT DOCUMENTS

| | | | | |
|---|---|---|---|---|
| 5,748,890 | A * | 5/1998 | Goldberg et al. ............ | 726/2 |
| 6,400,690 | B1 | 6/2002 | Liu et al. | |
| 6,546,431 | B1 | 4/2003 | Brown et al. | |
| 6,651,168 | B1 * | 11/2003 | Kao et al. ................ | 713/185 |
| 2002/0115453 | A1 | 8/2002 | Poulin et al. | |
| 2004/0167894 | A1 * | 8/2004 | Ziv ............................ | 707/9 |
| 2004/0268135 | A1 * | 12/2004 | Zimmer et al. ............ | 713/189 |
| 2005/0108516 | A1 * | 5/2005 | Balzer et al. ............... | 713/150 |
| 2006/0106936 | A1 * | 5/2006 | De Luca et al. ........... | 709/228 |

FOREIGN PATENT DOCUMENTS

| EP | 1 193 943 | | 4/2002 |
|---|---|---|---|
| EP | 1 193943 | A2 * | 4/2002 |

OTHER PUBLICATIONS

Sathya Srinivasan, Sun Certified Mobile Application Developer( 311-110), Feb. 19, 2004.*
Sathya Srinivasan, Sun Certified Mobile Application Developer(311-110), Feb. 19, 2004.*
Office Action from The Patent Office of the People's Republic of China for Chinese Application No. 2005800270669 mailed Jan. 9, 2009, 13 pages.
Notification of the Rejection Decision for Chinese Application No. 2005800270669, mailed Jan. 15, 2010, 19 pages.

* cited by examiner

*Primary Examiner*—Lechi Truong
(74) *Attorney, Agent, or Firm*—Banner & Witcoff, Ltd.

(57) ABSTRACT

A method, system, and computer program product provide access to user information, such as landmarks, without applications having to implement the needed user interface functionality on their own. In one embodiment, common landmark user interface components are offered with application programming interfaces (APIs) for controlling the user interfaces. By utilizing this kind of common user interface, all applications can utilize landmarks.

13 Claims, 4 Drawing Sheets

SHARED LANDMARK USER INTERFACES

FIELD OF THE INVENTION

The present invention relates generally to computer software platform user interfaces. More particularly, the present invention relates to trusted user interfaces and user sensitive data.

BACKGROUND OF THE INVENTION

Currently, software platforms offer interfaces to handle basic functionalities of landmarks and other types of private user information. For example, conventional platforms have interfaces for saving and searching for geographical location information, such as coordinates and/or addresses. However, such interfaces are implemented by each application that uses landmarks separately. Further, common dialog interfaces used by various applications are limited to specific functions, such as saving and searching. Computer applications do not obtain information using a common interface for any function.

As a example, a software application that provides a map, such as a mapping program or a GPS program, can display standard landmarks on the map and allow a user to add additional, user-defined landmarks. Such user-defined landmarks can be considered private data. Conventional platforms that run such programs require that such the mapping software application request user-defined landmark information using a dialog user interface from the software application. Such dialog user interfaces may differ from software application to software application.

Thus, there is a need for shared landmark user interfaces. Further, there is a need for applications to be able to utilize user sensitive information with a common interface. Even further, there is a need to offer common dialogs for any information used by a computer application.

SUMMARY OF THE INVENTION

The present invention is directed to a method, system, and computer program product in which information, such as landmarks, is accessible by applications without an implementing functionality of its own. In one embodiment, common landmark user interface components are offered with application programming interfaces (APIs). By utilizing this kind of common user interface, all applications can utilize landmarks without implementing a landmark user interface of their own.

Briefly, one exemplary embodiment relates to a method for providing shared user interfaces. The method includes accessing information requested by the application, including a user interface application programming interface that selectively activates common user interface dialogs upon request by a client via the user interface application programming interface.

Another exemplary embodiment relates to a system having an application programming interface for controlling and activating common dialogs. The system includes a software application that performs operations on a device, a user interface application programming interface (API) stored on the device, and storage that maintains information accessible by the client via the user interface API. The user interface API selectively activates common user interface dialogs upon request by a client.

Yet another exemplary embodiment relates to a computer program product (e.g., a computer readable storage medium) having an application programming interface for controlling and activating common user interface dialogs presented on a device having the computer program product stored thereon. The computer program product includes a user interface application programming interface that selectively activates common user interface dialogs upon request by a client and computer code. The computer code accesses the user interface application programming interface, and accesses information requested by the application.

Other principle features and advantages of the invention will become apparent to those skilled in the art upon review of the following drawings, the detailed description, and the appended claims.

BRIEF DESCRIPTION OF THE DRAWINGS

Exemplary embodiments will hereafter be described with reference to the accompanying drawings.

DETAILED DESCRIPTION OF EXEMPLARY EMBODIMENTS

Figure 1:
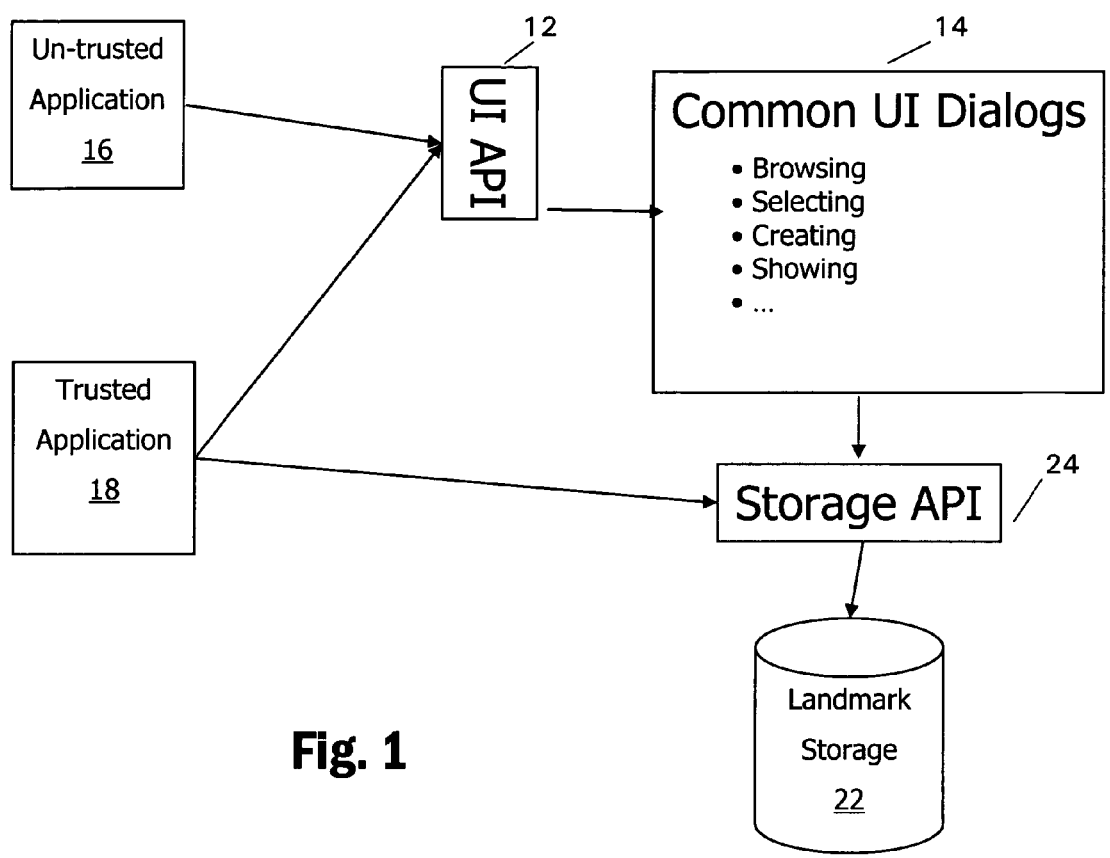
FIG. 1 is a diagram illustrating a system having an application programming interface for controlling and activating common landmark dialogs.

FIG. 1 illustrates a user interface (UI) application programming interface (API) 12 that controls and activates common user interface dialogs 14. Examples of common user interface dialogs 14 can include browsing, selecting, creating, and showing. The UI API 12 can be accessed by both an un-trusted application 16 and a trusted application 18. The un-trusted application 16 could be an application, such as a third party navigation application. The trusted application 18 could be an application, such as a calendar application, which is packaged to the device by the device manufacturer.

The common UI dialogs 14 and the trusted application 18 can access landmark storage 22 using a storage application programming interface (API) 24. The landmark storage 22 can be, for example, a database which can reside anywhere, such as in a device or on a network server. The storage API 24 is a common API for accessing landmarks without the UI API 12. The storage API 24 hides the internal storage structure, allowing the internal structure to be changed without disruption to the user. Further, the storage API 24 checks whether the client is allowed to use the methods of the API.

The UI API 12 provides a common user interface, allowing developers to not have to implement landmark UI themselves. The UI API 12 also enhances the end user experience because the landmarks functionality looks and is always the same. If an application is un-trusted and landmarks are handled as private data, then UI API 12 enables access to landmarks for un-trusted applications without jeopardizing the end user's personal data because the end user can control access via common UI dialogs 14.

The common UI dialogs 14 provide a uniform access interface for both trusted and un-trusted applications to obtain a variety of data, such as user sensitive data. Landmarks are an example of sensitive data.

Figure 2:
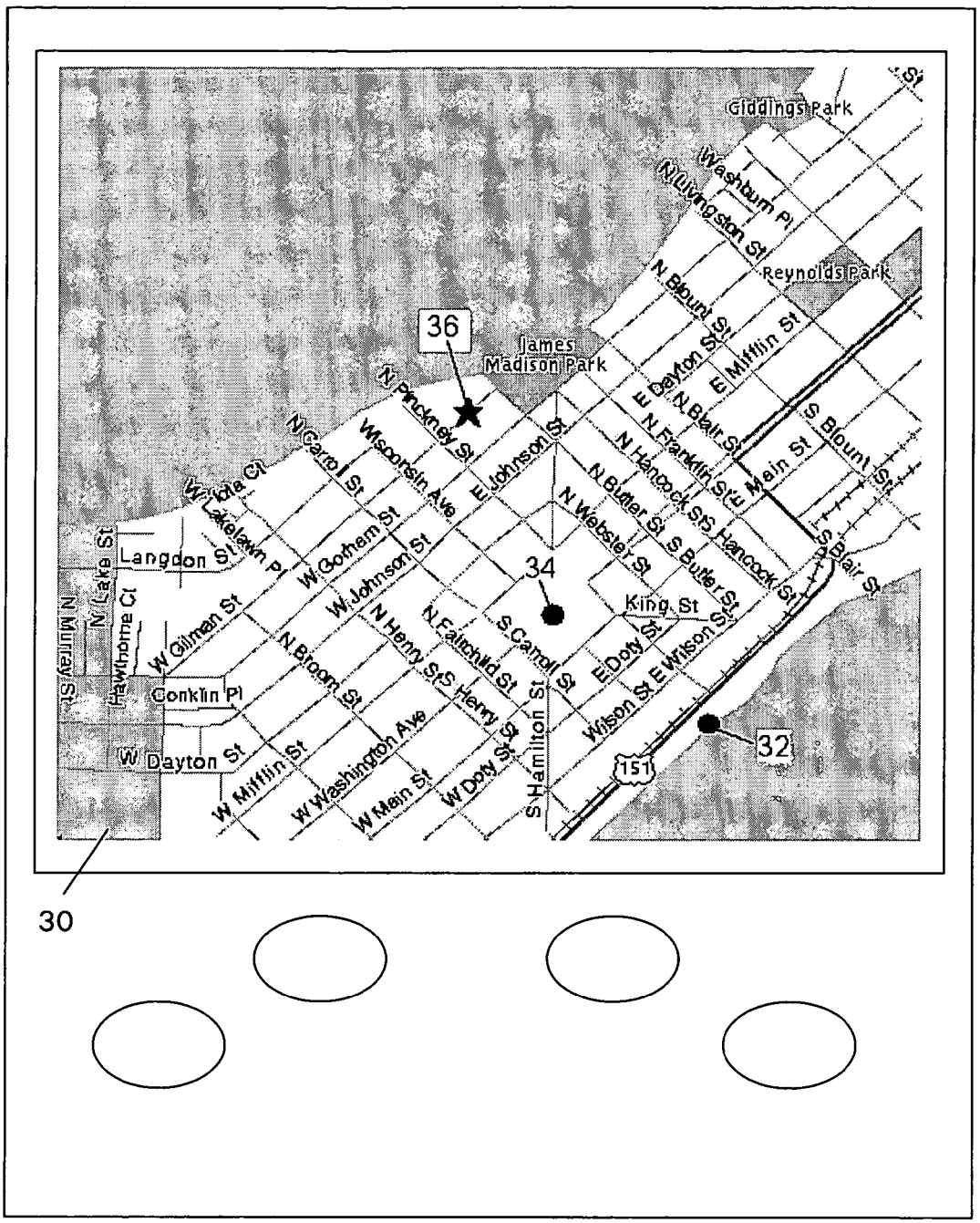
FIG. 2 is a diagram illustrating a user interface having landmarks in accordance with an exemplary embodiment.

FIG. 2 illustrates an example user interface 30 illustrating landmarks 32, 34 and 36. The user interface 30 is shown as a display of a personal digital assistant (PDA), but could also be used with a cell phone, a computer, or any other device. The landmark 36 is a location identified by a user as a landmark, such as an office location, apartment, or a restaurant. The landmark 36 can be private data.

The software application that provides map data, including the landmarks 32 and 34 may or may not be a trusted application. The software application can be a global positioning system (GPS) mapping program. To obtain information to locate a landmark, the software application interfaces with an application programming interface (API) that controls and activates common landmark dialogs.

Figure 3:
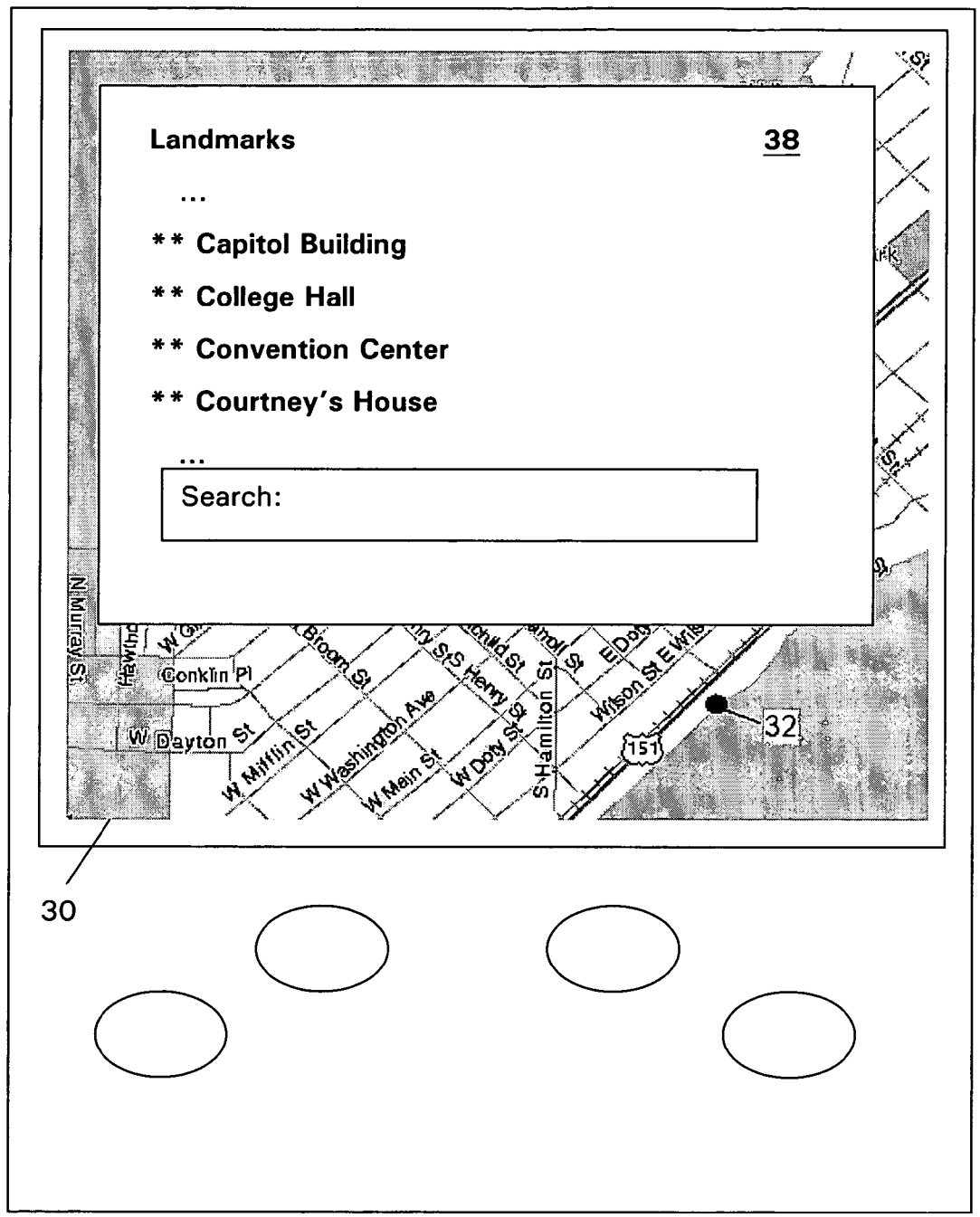
FIG. 3 is a diagram illustrating a common user interface dialog on the user interface of FIG. 2 in accordance with an exemplary embodiment.

FIG. 3 illustrates the user interface 30 including a common user interface dialog 38. The common user interface dialog 38 is separate from the application presenting the user interface 30. By way of example, the common user interface dialog 38 asks the user for information about selecting a landmark. The landmark can be selected from a list of landmarks, as shown in FIG. 3. In an exemplary embodiment, a text box is utilized where the user can enter a part of the landmark name to search for in the list of landmarks.

Figure 4:
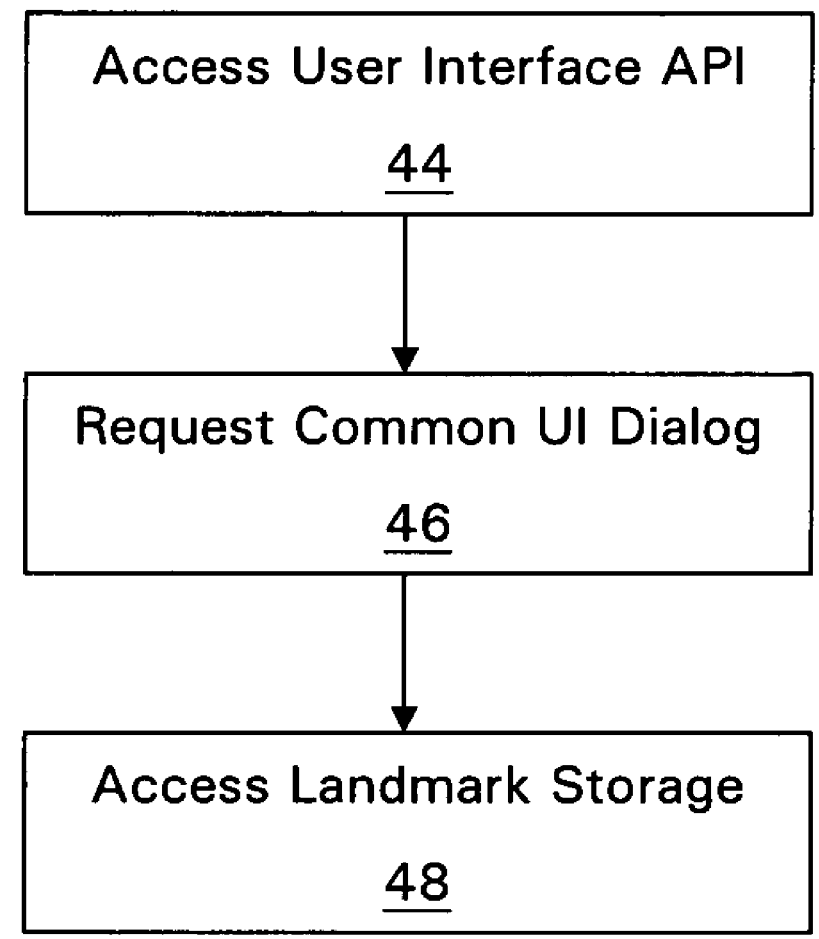
FIG. 4 is a flow diagram of exemplary operations in providing a shared landmark user interface.

FIG. 4 illustrates a flow diagram 40 of exemplary operations in a process of providing shared landmark user interfaces. Additional, fewer, or different operations may be performed in accordance with alternative embodiments. An operation 44 is performed in which a user interface (UI) application programming interface (API) is accessed. The UI API controls and activates common user interface (U) dialogs.

In an operation 46, a common UI dialog is requested by the application. Example dialogs can include a dialog for browsing, selecting, creating, showing, and other various functions. After operation 46, an operation 48 is performed in which access to landmark storage is provided such that the landmark is available to the application. Landmarks can be physical locations, such as locations on a map. However, the operations of FIG. 4 can also apply to any user data. Landmarks are used as an example only.

This detailed description outlines exemplary embodiments of a method, device, and system for shared landmark user interfaces. In the foregoing description, for purposes of explanation, numerous specific details are set forth in order to provide a thorough understanding of the present invention. It is evident, however, to one skilled in the art that the exemplary embodiments may be practiced without these specific details. In other instances, structures and devices are shown in block diagram form in order to facilitate description of the exemplary embodiments.

While the exemplary embodiments illustrated in the Figures and described above are presently preferred, it should be understood that these embodiments are offered by way of example only. Other embodiments may include, for example, different techniques for performing the same operations. The invention is not limited to a particular embodiment, but extends to various modifications, combinations, and permutations that nevertheless fall within the scope and spirit of the appended claims.

What is claimed is:

1. An apparatus comprising:
    memory storing a computer program product that, when executed by the apparatus, causes the apparatus to:
    determine whether an application program executing on the apparatus and attempting to access private user data is a trusted application or an untrusted application;
    when the application program is a trusted application, provide access to the private user data via a storage application programming interface (API) through which direct access is granted to the private user data; and
    when the application program is not a trusted application, provide access to the private user data only via a user interface API through which access is granted to the private user data using a predetermined dialog box user interface,
    wherein the private user data includes a landmark created by a user of the apparatus, and the predetermined dialog box user interface includes a landmark search dialog box through which a user can search for a landmark stored in the private user data.

2. The apparatus of claim 1, further comprising, in the memory, a database storing the private user data.

3. The apparatus of claim 1, wherein when the application is a trusted application, wherein the computer program product further provides the trusted application access to the private user data via the user interface API.

4. The apparatus of claim 1, further comprising a visual display, and wherein said computer program product causes the apparatus to analyze the private user data landmark and display a corresponding location on a map on the visual display.

5. The apparatus of claim 1, comprising a mobile telephone with a global positioning system.

6. The apparatus of claim 1, wherein the application comprises a global positioning system-based mapping application configured to present positioning information to the user.

7. A method, comprising:
    determining, by a mobile apparatus, whether an application program executing on the mobile apparatus and attempting to access a database storing private user data is a trusted application or an untrusted application;
    when the application program is a trusted application, providing access to the private user data via a storage application programming interface (API) through which direct access is granted to the private user data; and
    when the application program is not a trusted application, providing access to the private user data only via a user interface API through which access is granted to the private user data using a predetermined dialog box user interface,
    wherein the private user data includes a landmark created by a user of the apparatus, and the predetermined dialog box user interface includes a landmark search dialog box through which a user can search for a landmark stored in the private user data.

8. The method of claim 7, wherein the private user data is stored in the mobile apparatus.

9. The method of claim 7, further comprising, when the application is a trusted application, also providing the trusted application access to the private user data via the user interface API.

10. The method of claim 7, wherein the mobile apparatus comprises a visual display, and wherein the method further comprises analyzing the private user data landmark and displaying a corresponding location on a map displayed on the visual display.

11. The method of claim 7, wherein the mobile apparatus comprises a mobile telephone with a global positioning system.

12. The method of claim 7, wherein the application comprises a global positioning system-based mapping application configured to present positioning information to the user.

13. Memory storing computer readable instructions that, when executed by a data processing device, causes a mobile apparatus to:

determine, by the mobile apparatus, whether an application program is a trusted application or an untrusted application, said application program executing on the mobile apparatus and attempting to access a database storing private user data, wherein said private user data comprises one or more geographic landmarks created by a user of the apparatus;

when determining that the application program is a trusted application, provide access to the private user data via a storage application programming interface (API) through which direct access is granted to the private user data; and when determining that the application program is not a trusted application, provide access to the private user data only via a user interface API through which access is granted to the private user data using a predetermined dialog box user interface, wherein the private user data includes a landmark created by a user of the mobile apparatus, and the predetermined dialog box user interface includes a landmark search dialog box through which a user can search for a landmark stored in the private user data, and wherein said predetermined dialog box user interface is common to all applications accessing the database via the user interface API.

* * * * *